(12) United States Patent
Ono et al.

(10) Patent No.: US 10,130,966 B2
(45) Date of Patent: Nov. 20, 2018

(54) MASKING MATERIAL, METHOD FOR PRODUCING MASKING MATERIAL, AND MASKING METHOD

(75) Inventors: Yoshitomo Ono, Tokyo (JP); Yumiko Amino, Tokyo (JP); Taichi Suzuki, Tokyo (JP); Kiyoshi Koibuchi, Tokyo (JP)

(73) Assignees: LINTEC CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 578 days.

(21) Appl. No.: 13/822,387

(22) PCT Filed: Sep. 5, 2011

(86) PCT No.: PCT/JP2011/070135
§ 371 (c)(1),
(2), (4) Date: Mar. 12, 2013

(87) PCT Pub. No.: WO2012/043152
PCT Pub. Date: Apr. 5, 2012

(65) Prior Publication Data
US 2013/0174976 A1     Jul. 11, 2013

(30) Foreign Application Priority Data
Sep. 30, 2010   (JP) ................. 2010-222362

(51) Int. Cl.
*B29C 45/16*      (2006.01)
*B05B 15/04*      (2006.01)
(Continued)

(52) U.S. Cl.
CPC .......... *B05B 15/0456* (2013.01); *B05B 12/20* (2018.02); *B05B 12/24* (2018.02); *B29C 45/16* (2013.01); *H01F 7/0215* (2013.01)

(58) Field of Classification Search
CPC ........ H01F 27/255; H01F 1/37; H01F 7/0215; B05B 15/045; B05B 12/20; B05B 12/24; B05B 15/0456; B29C 45/16
(Continued)

(56) References Cited

U.S. PATENT DOCUMENTS 3,420,692 A * 1/1969 Jeff et al. ...................... 427/335
3,709,956 A * 1/1973 Nordstrom .................... 525/29
(Continued)

FOREIGN PATENT DOCUMENTS

GB       2168650       * 12/1984
JP       61-234972 A    10/1986
(Continued)

OTHER PUBLICATIONS

Translated Abstract of Nomura et al. (JP 63-128071).*
Par Group Nylon 12 NPL document, retrieved Jan. 24, 2014.*
MGC MXD6 NPL document, retrieved Jan. 24, 2014.*
PolymerProcessing Nylon6 NPL document, retrieved Dec. 29, 2014.*
(Continued)

*Primary Examiner* — Michael B Nelson
(74) *Attorney, Agent, or Firm* — Posz Law Group, PLC

(57) ABSTRACT

A masking material for use in a heating process includes: a base material comprising a resin as a main resin component and containing a magnetic substance, the resin having a higher melting point than a temperature of the heating process, the magnetic substance having a higher Curie temperature than the temperature of the heating process; and a releasable protective layer formed on one surface of the base material, the releasable protective layer comprising a releasable protective material. The masking material has excellent heat resistance property and can be repeatedly used.

20 Claims, 1 Drawing Sheet

(51) Int. Cl.
  *H01F 7/02*   (2006.01)
  *B05B 12/24*  (2018.01)
  *B05B 12/20*  (2018.01)

(58) Field of Classification Search
  USPC .................... 428/411.1; 427/282; 252/62.54
  See application file for complete search history.

(56) References Cited

U.S. PATENT DOCUMENTS

| | | | | |
|---|---|---|---|---|
| 5,702,774 | A * | 12/1997 | Griffin et al. | 427/598 |
| 6,312,795 | B1 * | 11/2001 | Yamamoto | 428/323 |
| 6,350,491 | B1 * | 2/2002 | Williams | 427/384 |
| 2002/0082341 | A1 * | 6/2002 | Matsuno et al. | 524/589 |
| 2003/0034476 | A1 * | 2/2003 | Sasazawa et al. | 252/62.54 |

FOREIGN PATENT DOCUMENTS

| | | | |
|---|---|---|---|
| JP | 61-257259 | A | 11/1986 |
| JP | 63-128071 | * | 5/1988 |
| JP | 01-63955 | U | 4/1989 |
| JP | 08-024773 | A | 1/1996 |
| JP | 3102585 | B | 8/2000 |

OTHER PUBLICATIONS

Full Human translation of JP 63/128,071—retrieved Jul. 31, 2016.*
International Search Report of the International Searching Authority dated Nov. 15, 2011 for the corresponding international application No. PCT/JP2011/070135 (with English translation).

* cited by examiner

MASKING MATERIAL, METHOD FOR PRODUCING MASKING MATERIAL, AND MASKING METHOD

CROSS REFERENCE TO RELATED APPLICATIONS

This application is a U.S. national stage application of PCT/JP2011/070135 filed on Sep. 5, 2011, and claims priority to, and incorporates by reference, Japanese Patent Application No. 2010-222362 filed on Sep. 30, 2010.

TECHNICAL FIELD

The present invention relates to a masking material for masking a part that is unwanted to be applied thereto with some paint during painting, a production method for a masking material, and a masking method.

BACKGROUND ART

In order to mask a part that is unwanted to be applied thereto with some paint during painting, a masking tape has been heretofore used in general. The masking tape, which comprises a tape base material, a pressure-sensitive adhesive layer and a release paper, is used in such a manner that the release paper is released and the adhesive force of the exposed pressure-sensitive adhesive layer is utilized to apply the masking tape to a part to be masked. After the painting, the masking tape is detached from the masked part to be discarded.

Such a masking tape leads to waste of resources because the released paper and also the masking tape after the painting remain as garbage to be discarded. In addition, if, after detaching the masking tape having been once applied, one attempts to apply the masking tape again, then the tape may not be applied due to the deterioration in the adhesive force of the pressure-sensitive adhesive layer. Further, in order for the masking tape to be applied by the adhesive force of the pressure-sensitive adhesive layer, oil components must be removed from a part to be masked for obtaining a desired adhesive force, and a degreasing work is required thus bothering.

To overcome the above, Patent Literature 1 and 2 propose to use sheets that contain magnetic powder as masking sheets. According to such masking sheets, work saving for masking work can be possible by utilizing the magnetic force.

PRIOR ART LITERATURE

Patent Literature

[Patent Literature 1] Published Patent Application No. 61/257,259
[Patent Literature 2] U.S. Pat. No. 3,102,585

SUMMARY OF THE INVENTION

Problems to be Solved by the Invention

The masking sheet described in Patent Literature 1, however, comprises non-rigid plastic as a main resin component, such as chlorinated polyethylene, nitrile rubber (NBR), ethylene-propylene-diene rubber (EPDM), chlorinated polyethylene (CPE), ethylene-vinyl acetate copolymer (EVA), chlorosulfonated polyethylene and non-rigid poly vinylchloride, and the heat resistance property is poor. Therefore, if used in a heating process of 160° C. for example, the masking sheet may deform or melt, thus being problematic. In particular, the molten masking sheet may thermally adhere to the masked part to contaminate the part.

Note that the upper surface of the masking sheet described in Patent Literature 1 is laminated thereon with a solvent resistant thin film, such as polyethylene film and polypropylene film. Therefore, so long as not being used in a heating process as described above, the masking sheet can be recycled because a paint attached to the laminated film can readily be detached due to the surface tension of the laminated film.

On the other hand, the masking sheet described in Patent Literature 2 involves a resin, which comprises ethylene-methyl acrylate copolymer and ethyl acrylate based copolymer, as a main resin component, thereby to have heat resistance property. However, because the paint attached to the masking sheet cannot readily be removed, if the masking sheet is repeatedly used, then the thickness of the paint attached to the masking sheet increases to disable the masking sheet to be used for masking.

The present invention has been created in view of such circumstances, and objects thereof include providing a masking material that has excellent heat resistance property and can be repeatedly used, a production method for such a masking material, and a masking method using such a masking material.

Means for Solving the Problems

In order to achieve the above objects, first, the present invention provides a masking material for use in a heating process, the masking material comprising: a base material comprising a resin as a main resin component and containing a magnetic substance, the resin having a higher melting point than a temperature of the heating process, the magnetic substance having a higher Curie temperature than the temperature of the heating process; and a releasable protective layer formed on one surface of the base material, the releasable protective layer comprising a releasable protective material (Invention 1).

Second, the present invention provides a masking material for use in a heating process, the masking material comprising: a base material comprising a resin as a main resin component and containing a magnetic substance, the resin having a higher melting point than a temperature of the heating process, the magnetic substance having a higher Curie temperature than the temperature of the heating process, wherein a releasable protective material is applied to one surface of the base material in any step before painting (Invention 2).

According to the above invention (Invention 1, 2), the base material of the masking material employs as a main resin component a resin that has a higher melting point than a temperature of the heating process, thereby to exhibit excellent heat resistance property and dimensional stability even for use in the heating process, and can thus be repeatedly used. Moreover, the magnetic substance contained in the base material has a higher Curie temperature than the temperature of the heating process, thus preventing the masking material to depart from the masked part due to the magnetic force being reduced during the heating process. Furthermore, the releasable protective layer (releasable protective material) is released from the base material after painting thereby allowing the paint attached to the masking material to be removed, and therefore, the releasing and the re-forming (re-applying) of this releasable protective layer (releasable protective material) can be repeated to allow the masking material to be repeatedly used many times.

In the above invention (Invention 1, 2), it is preferred that the resin is a polyamide resin (Invention 3).

In the above invention (Invention 1-3), it is preferred that the releasable protective material is a sealing material or a strippable paint (Invention 4).

In the above invention (Invention 1-4), it is preferred that a dimension change rate caused by the heating process is 1.0% or less in a masking surface direction (Invention 5).

In the above invention (Invention 1-5), it is preferred that a magnetic fixing force to a stainless plate is within a range of 3 to 20 N/40 mm (Invention 6).

Third, the present invention provides a production method for a masking material for use in a heating process, the production method comprising: producing a base material comprising a resin as a main resin component and containing a magnetic substance, the resin having a higher melting point than a temperature of the heating process, the magnetic substance having a higher Curie temperature than the temperature of the heating process; and applying a releasable protective material to one surface of the base material in any step before painting (Invention 7).

In the above invention (Invention 7), it is preferred that the base material is molded by injection molding (Invention 8).

Fourth, the present invention provides a masking method of performing masking a member as a masking object during a painting work, the member comprising a magnetic substance, the painting work including a heating process, the masking method comprising: magnetically fixing a base material to a part of the masking object to be masked, the base material comprising a resin as a main resin component and containing a magnetic substance, the resin having a higher melting point than a temperature of the heating process, the magnetic substance of the base material having a higher Curie temperature than the temperature of the heating process and being magnetized; applying a releasable protective material to a surface of the base material in any step before painting thereby causing a masking material to comprise a releasable protective layer; detaching the masking material from the masked part after the painting; and releasing the releasable protective layer from the surface of the base material of the masking material in any step after the painting (Invention 9).

In the above invention (Invention 9), the masking object may be a steel plate for a car after undercoating (Invention 10).

Advantageous Effect of the Invention

The masking material according to the present invention has excellent heat resistance property and can be repeatedly used. In addition, the production method for a masking material according to the present invention allows the masking material as described above to be produced. Further, the masking method according to the present invention allows the masking material to be repeatedly used.

EMBODIMENTS FOR CARRYING OUT THE INVENTION

Embodiments of the present invention will hereinafter be described.
<Masking Material>

Figure 1:
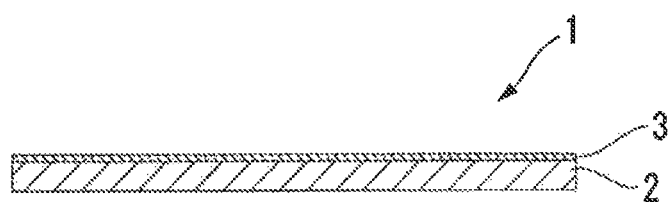
FIG. 1 is a cross-sectional view of a masking material according to one embodiment of the present invention.

As shown in FIG. 1, masking material 1 according to the present embodiment is configured to comprise a base material 2 and a releasable protective layer 3 formed on one surface (upper surface in FIG. 1) of the base material 2. This masking material 1 is for use in a heating process, such as heat curing process (baking process) for a paint, etc.

The base material 2 comprises a resin, as a main resin component, which has a higher melting point than the temperature of the heating process. Using such a resin prevents the base material 2 from deforming or melting even for use under the heating process, and the masking material 1 has excellent heat resistance property thereby to allow for repeated use. Note that the "main resin component" as used herein refers to a resin component to be a main constituent in the resin that constitutes the base material. The resin that constitutes the base material 2 may consist only of the above main resin component, or may be a mixture of the above main resin component and one or more other resins so long as not negatively affecting the heat resistance property of the base material 2.

The temperature of the heating process, such as baking process for a paint, is usually within a range of 120° C. to 160° C. Therefore, it is enough if a resin having a higher melting point than the temperature is used. Such a resin to be used preferably has a melting point of 170° C. or more, further preferably 180° C. or more, and most preferably 200° C. or more.

Examples of the above resin include: polyamide resins, such as nylon 4, nylon 6, nylon 46, nylon 66, nylon 610, nylon 69, nylon 612, nylon 1212, nylon 11, nylon 12, nylon MXD6, and nylon 6T; polyimid resins; polyamide-imide resins; polyester resins; polyethersulfone resins; polyetherimide resins; polyphenylene ether resins; polybenzimidazole resins; polybenzoxazole resins; polyphenylene sulfide resins; and polyether ether ketone resins, etc, and one kind may be used alone or two or more kinds may be mixed to be used in combination. Among them, polyamide resins are preferable because of having excellent dimensional stability and chemical resistance property, and nylon 6 is particularly preferable. Polyamide resins generally have a melting point of 170° C. or more, and that of nylon 6 is about 220° C.

The base material 2 comprises the above resin or resins as the main resin component and contains a magnetic substance that has a higher Curie temperature than the temperature of the heating process. If the base material 2 of the masking material 1 contains a magnetic substance, then the magnetic substance can be magnetized to thereby causing the masking material 1 to be magnetically fixed to a member that comprises a magnetic substance, such as steel plate or steel product. This allows for easily performing to attach the masking material 1 to a part to be masked, and to detach the masking material 1 from the masked part.

The magnetic substance is required to have a higher Curie temperature than the temperature of the heating process. As described above, the temperature of the heating process, such as baking process for a paint, is usually within a range of 120° C. to 160° C. Therefore, the Curie temperature of the magnetic substance should be that temperature or higher. This is because the magnetic force of the magnetic substance having been magnetized decreases during the heating process and the masking material 1 is to depart from the masked part if the Curie temperature of the magnetic substance is lower than the temperature of the heating process.

Examples of the magnetic substance include metals, such as iron, nickel and cobalt, alloys (e.g. stainless steel) and oxides thereof; and various-based magnetic substances, such as strontium ferrite, barium ferrite, manganese zinc ferrite, nickel zinc ferrite, copper zinc ferrite and other ferrite-based, aluminum-nickel-cobalt alloy and other alnico-based, and rare-earth/transition metal based (e.g. SmCo-based, SmFeN-based, NbFeB-based) and other rare-earth based. Among them, ferrite-based magnetic substances are preferable in view of facility in controlling the magnetic force, wherein strontium ferrite and barium ferrite are more preferable.

Form of the magnetic substance is preferred to be powder form. If being powder form, the particle size thereof is preferably within a range of 0.1 to 100 μm, more preferably 0.5 to 20 μm, and most preferably 0.5 to 3 μm.

The contained amount of the magnetic substance in the base material 2 is preferably within a range of 300 to 800 parts by mass relative to 100 parts by mass of resin or resins that constitute the base material 2, more preferably 400 to 700 parts by mass, and most preferably 500 to 600 parts by mass.

The base material 2 may contain one or more additives, such as dispersant, in addition to the above resin or resins and the magnetic substance.

The thickness of the base material 2 is preferably within a range of 1 to 3 mm, and more preferably 1.5 to 2.0 mm. If the thickness of the base material 2 is less than 1 mm, then the masking material 1 may possibly be insufficient in its strength and is also likely to deform under a high temperature. If, on the other hand, the thickness of the base material 2 exceeds 3 mm, then the masking material 1 becomes unnecessarily thick and the material cost also rises.

As a releasable protective material that constitutes the releasable protective layer 3, a heretofore known sealing material or a strippable paint for cars may be used, and a sealing material for use in sealing formation for cars may preferably be used. In particular, it is preferred to use a sealing material (dust sealer) which is a remainder after the sealing formation in view of efficient use of cost and materials.

The releasable protective material is preferred to have excellent heat resistance property at the temperature of the heating process, such as baking process for a paint. If the heat resistance property is poor, then the releasable protective layer 3 may not be released from the base material 2. Therefore, the above sealing material is preferred to be of heat curable type, and the releasable protective layer 3 thereby has excellent heat resistance property.

Specific examples of the sealing material include: poly vinyl chloride based plastisol that comprises poly vinyl chloride based resin as a main component; acrylic-based plastisol that comprises acrylic-based resin as a main component; compositions obtained by compounding thermosetting materials to such plastisols; thermosetting resin composition that comprises epoxy resin as a main component; and thermosetting resin composition that comprises polyurethane resin as a main component. The sealing material may be one-pack type or two-pack type. Among the above examples, it is preferred to use a composition obtained by compounding thermosetting material to acrylic-based plastisol in respect to releasability, heat resistance property and workability.

The strippable paint for cars may be of water soluble or solvent-based. Heretofore known strippable paints may be used, such as latex-type strippable paints including poly vinyl-chloride, chloroprene and other halogenated hydrocarbon, and acrylic emulsion type strippable paints.

The thickness of the releasable protective layer 3 is preferably within a range of 0.3 to 3.0 mm, more preferably 0.5 to 2.5 mm, and most preferably 1.5 to 2.0 mm. If the thickness of the releasable protective layer 3 is less than 0.3 mm, then the releasable protective layer 3 may possibly have an insufficient strength and will be broken when being peeled from the base material 2 after painting, thus being difficult to be released. If, on the other hand, the thickness of the releasable protective layer 3 exceeds 3.0 mm, then the releasable protective layer 3 becomes unnecessarily thick and the material cost also rises.

The method for forming the releasable protective layer 3 is not particularly limited, and the releasable protective material may be applied to form the releasable protective layer 3 using a conventionally known method. Available applying methods include, for example, manual brush painting, spray method, curtain flow coater method, roll coater method, dipping method, and mechanical coating using a robot, etc.

Note that the timing for forming the releasable protective layer 3 is not particularly limited. That is, the releasable protective layer 3 may be formed immediately after the production of the base material 2, or may otherwise be formed in any step before the painting, such as in a step before the base material 2 is attached to a part to be masked or in a step where the base material 2 has been attached to the part.

A dimension change rate of the above masking material 1 caused by the heating process is preferably 1.0% or less each in a longitudinal direction and a cross direction in a masking surface direction (planar direction of the masking material 1 in the present embodiment), and more preferably 0.5% or less, and most preferably 0.1% or less. If the dimension change rate of the masking material 1 is within the above ranges, then the dimensional stability of the masking material 1 can be said as being excellent, and the masking material 1 may be repeatedly used with its determined dimensions.

Here, the dimension change rate caused by the heating process is defined by the expression below:

$$\text{Dimension exchange rate (\%)} = (X2/X1) \times 100,$$

where X1 is a length of one side of the masking material 1 in the planar direction before the heating process, and X2 is a length of the one side in the planar direction after the heating process.

In order for the dimension change rate of the masking material 1 to fall within the above ranges, resin or resins that constitute the base material 2 may appropriately be selected, and this can be achieved by selecting polyamide resin, for example.

A magnetic fixing force of the masking material 1 to a stainless plate is preferably within a range of 3 to 20 N/40 mm, and more preferably 4 to 15 N/40 mm. If the magnetic fixing force of the masking material 1 is 4 N/40 mm or more, then the masking material 1 is ensured to be attached to a part to be masked when the masking object is a steel plate for cars, for example. Further, if the magnetic fixing force of the masking material 1 is 20 N/40 mm or less, then excessive effort or human force is not required to detach the masking material 1 from the masked part.

Here, the magnetic fixing force (N/40 mm) to a stainless plate is defined as a value that is measured by a test in which a 100 mm length end portion of the masking material 1

(width 40 mm×length 150 mm, thickness 1.5 mm) is applied to a stainless plate (1.5 mm thickness, SUS 430 plate) (the remaining 50 mm length of the masking material 1 acts as a portion to be held) to establish a state where the masking material 1 is partly applied to the stainless plate, and a tensile tester is then used to pull parallelly, in the length direction, the masking material 1 and the stainless plate in opposite directions to each other with a speed of 300 mm/min.

The magnetic force of the masking material 1 is preferred to be within a range of 20 to 100 mT. If the magnetic force of the masking material 1 is 20 mT or more, then the masking material 1 is ensured to be attached to a part to be masked (a member including a magnetic substance). Further, if the magnetic force of the masking material 1 is 100 mT or less, then excessive effort or human force is not required to detach the masking material 1 from the masked part. The magnetic force as used herein is a magnetic force that is measured using a gaussmeter at a location separated by 1 cm from the surface of the masking material 1.

In order for the magnetic fixing force and the magnetic force of the masking material 1 to fall within the above ranges, the type and the contained amount of a magnetic substance to be contained in the base material 2 may be appropriately selected and adjusted.

Note that the timing for magnetizing the magnetic substance used in the base material 2 of the masking material 1 is not particularly limited. That is, the timing for magnetizing the magnetic substance may be before the magnetic substance is compounded into the resin of the base material 2 (in which case a preliminarily magnetized magnetic substance is compounded), or may otherwise be in any step after the base material 2 or the masking material 1 is produced and before it is attached to a part to be masked. In the latter case, the magnetic substance can be magnetized by using any known apparatus, such as magnetizing/de-magnetizing apparatus.

Figure 2:
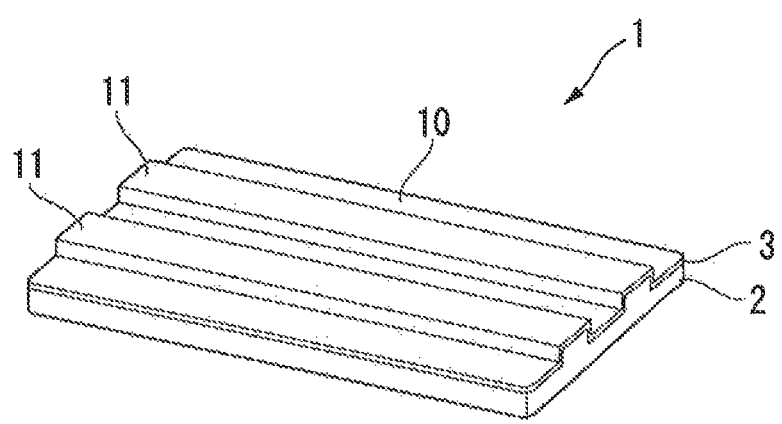
FIG. 2 is a perspective view of the masking material according to the embodiment.

As shown in FIG. 2, the masking material 1 according to the present embodiment comprises a plate-like main body portion 10 having a rectangular planar view and two reinforcing rib portions 11 formed on one surface of the plate-like main body portion 10. The two reinforcing rib portions 11 are provided along the longitudinal direction of the plate-like main body portion 10 to be parallel to each other. Four corners of the plate-like main body portion 10 are each rounded.

The reinforcing rib portions 11 may not necessarily be required, but are preferred to be provided if the base material 2 is thin and it is difficult to obtain a desirable strength as the masking material 1. Specifically, the reinforcing rib portions 11 are preferable to be provided if the thickness of the base material 2 (plate-like main body portion 10) is less than 2.5 mm, and particularly less than 2.0 mm. The reinforcing rib portions 11 may be formed by injection molding concurrently with the production of the base material 2 as will be described later.

The size of the masking material 1 in a planar direction is not particularly limited, and may appropriately be set depending on the size of a part to be masked. If, for example, the part to be masked is a region stamped thereon with the vehicle identification number of a steel plate for a car, then the size of the masking material 1 in the planar direction is preferred to be within a range of 30 to 70 cm×120 to 200 cm, and more preferred is within a range of 40 to 50 cm×140 to 180 cm.

The masking material 1 as described above can be magnetically fixed to a member (part to be masked) that comprises a magnetic substance, such as steel plate or steel product, by the magnetic force of the magnetic substance contained in the base material 2. This allows the masking material 1 to be readily attached to a part to be masked and detached from the masked part, and the masking material 1 can thus be repeatedly used. Such a masking material 1 has advantages that no garbage remains, re-applying is easy, and degreasing is unnecessary, unlike a masking tape.

Moreover, the base material 2 of the masking material 1 employs as a main resin component a resin that has a higher melting point than a temperature of the heating process, thereby to exhibit excellent heat resistance property and dimensional stability even for use in the heating process, and can thus be repeatedly used.

Furthermore, the above magnetic substance contained in the base material 2 has a higher Curie temperature than the temperature of the heating process, thus preventing the masking material 1 to depart from the masked part due to the magnetic force being reduced during the heating process.

In addition, the masking material 1 according to the present embodiment has the releasable protective layer 3 to form the surface thereof, so that what is applied thereto with some paint by painting is the releasable protective layer 3. Therefore, the paint applied to the masking material 1 can be removed by pealing the releasable protective layer 3 from the base material 2. After the releasable protective layer 3 is released from the base material 2, a releasable protective layer 3 may be formed again on the base material 2. Thus, the releasing and the re-forming of releasable protective layers 3 may be repeated to thereby allow the masking material 1 to be repeatedly used many times.

<Production Method for Masking Material/Masking Method>

The description will then be directed to a production method for the masking material 1 according to one embodiment of the present invention and a masking method using the masking material 1. It should be appreciated that the methods below are for the purpose of exemplification and the present invention is not limited thereto. The masking object may be, but not limited to, a member that comprises a magnetic substance such as steel plate or steel product, and examples thereof include a steel plate for cars. As a part to be masked in the present embodiment, a planar part of a steel plate for cars after undercoating is exemplified, but the present invention is not limited thereto.

The base material 2 is initially produced. The base material 2 may be produced using a conventionally known method, such as calender molding, injection molding or extrusion molding, and is preferably produced using injection molding method. The base material 2 can thus be produced using extrusion molding method, in which case, however, the plate-like main body portion 10 of the obtained base material 2 may sometimes not be flattened. In contrast, according to injection molding method, the plate-like main body portion 10 of the obtained base material 2 may sufficiently be flattened thereby to ensure that the masking material 1 is closely attached to a planar part to be masked. Particularly in the case where the above reinforcing rib portions 11 are provided, it is more preferred to produce the base material 2 using injection molding. In any method, the molding or shape forming is performed after melting and mixing the resin as the main resin component with the magnetic substance (preferably magnetic powder), if necessary along with additives, using Henschel mixer, single or twin screw extruder, Banbury mixer, roll or other appropriate equipment.

The base material 2 is obtained in such a manner, and if the magnetic substance contained in the base material 2 has not been magnetized, the magnetic substance is magnetized using a conventionally known method.

The obtained base material 2 is magnetically fixed to a part to be masked, i.e. a desired region on a planar part of a steel plate for cars after undercoating in the present embodiment, such as a region stamped thereon with the vehicle identification number. A releasable protective material is then applied to the surface of the base material 2 to form the releasable protective layer 3. The applying of the releasable protective material may be performed by appropriately selecting from the above methods.

In a painting process for a steel plate for cars, sealing formation may be performed to a desired region of the steel plate for cars. According to one embodiment of the present invention, such a sealing formation is performed to a desired region of a steel plate for cars, and a sealing material (dust sealer) as a remainder after the sealing formation is applied to the surface of the base material 2. The applying method for the sealing material is as described above.

Thereafter, the sealing material is cured by heating. The temperature for the heating is ordinarily within a range of 130° C. to 150° C. The releasable protective layer 3 is formed in such a manner, and the masking material 1 is thereby obtained.

Next, painting and heat curing of the paint are repeated a desired number of times, and water sanding and subsequent heat curing may possibly be repeated a desired number of times. The temperature during such a heat curing is ordinarily within a range of 120° C. to 160° C. The base material 2 of the masking material 1 according to the present embodiment has excellent heat resistance property thereby to be avoided from deforming and melting under the above heating process, thus prevented from thermally adhering to the masked part. In addition, the masking material 1 is unlikely to depart from the masked part due to the reduced magnetic force of the magnetic substance contained in the base material 2.

After completing processes for the last painting and heat curing the paint, the masking material 1 is detached from the masked part. Thereafter, or after repeating the above painting processes to increase the attached amount of the paint to the masking material 1 (releasable protective layer 3), the releasable protective layer 3 is released from the surface of the base material 2 in that masking material 1.

The base material 2 from which the releasable protective layer 3 has been released is then attached again to a part to be masked in a similar manner to the above. The masking material 1 has excellent dimensional stability and is easy to be removed therefrom the attached paint, thus being allowed to be repeatedly used in the above manner.

It should be appreciated that the embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, the masking material 1 may have no reinforcing rib portion 11 and consist only of a plate-like main body portion 10 having a rectangular planar view, or may have a shape other than rectangular shape, such as any polygonal shape, circular shape or elliptical shape. Moreover, the masking material 1 may not be of planar-like, and may have any three-dimensional shape, such as angle material shape or channel material shape. Furthermore, the masking material 1 may be provided with one or more holding portions that can be held by robot hand or the like.

EXAMPLES

The present invention will hereinafter be described more in detail with reference to examples etc, but the scope of the present invention is not limited to these examples etc.

Example 1

A composition was obtained by sufficiently mixing nylon 6 resin (melting point 220° C.) 16% (volume ratio) and strontium ferrite ($SrO.6Fe_2O_3$) powder (average particle diameter 2 μm, Curie temperature 460° C.) 84% (volume ratio) as a magnetic substance. That composition was subjected to injection molding to produce a base material having a size of 40 mm×150 mm and a thickness of 1.5 mm. Thereafter, a sealing material comprised of acrylic-based plastisol (Penguin Seal #2150 available from Sunstar Engineering Pte. Ltd.) as a releasable protective material was applied to the substrate surface to have a thickness of 1.0 mm by brush painting, and a masking material was thus obtained.

Example 2

A masking material was produced in a similar manner to Example 1 except that a strippable paint (Wrap-Guard L WG-20 available from Kansai Paint Co., Ltd.) was applied to have a thickness of 0.5 mm substitute for the sealing material.

Comparative Example 1

A composition was obtained by sufficiently mixing non-rigid poly vinyl chloride resin (melting point 120° C.) 15% (volume ratio) and strontium ferrite ($SrO.6Fe_2O_3$) powder (average particle diameter 2 μm, Curie temperature 460° C.) 85% (volume ratio) as a magnetic substance. That composition was subjected to calender molding to produce a base material having a size of 40 mm×150 mm and a thickness of 1.5 mm. Thereafter, a sealing material comprised of acrylic-based plastisol (Penguin Seal #2150 available from Sunstar Engineering Pte. Ltd.) as a releasable protective material was applied to have a thickness of 1.0 mm by brush painting, and a masking material was thus obtained.

Testing Examples

A stainless plate (1.5 mm thickness, SUS 430 plate) as an adherend was applied thereto with each masking material produced in Examples 1 and 2 and Comparative Example 1, and spray painting was performed (Paint: Lacquer Spray Black available from Asahipen Corporation). In that painting, heating was performed at 160° C. during 4 hours as a heating process. After performing 20 cycles of that heating process, releasability of the releasable protective layer, availability of repeated use, dimensional change rate, appearance change, magnetic force and magnetic fixing force were confirmed as below. In addition, masking materials produced in Examples 1 and 2 and Comparative Example 1 were subjected to tests for impact resistance and chemical resistance as below. Results are shown in Table 1.

<Releasability of Releasable Protective Layer>

After performing 20 cycles of the heating process, the releasability was confirmed by releasing each releasable protective layer from the masking material:

○: The releasable protective layer was able to be released; and

×: The releasable protective layer was not able to be released.

<Availability of Repeated Use>

After performing 20 cycles of the heating process, the detachability of the masking material from the adherend was confirmed:

○: The masking material did not thermally adhere to the adherend, and no contamination to the adherend was present;

×: The masking material did thermally adhere to the adherend.

<Dimensional Change Rate and Observation of Appearance Change>

After performing 20 cycles of the heating process, the dimensional change of the masking material was measured for each of the longitudinal direction (150 mm) and the cross direction (40 mm) to obtain a dimensional change rate (%). In addition, the appearance change was visually confirmed. Note that the dimensional change rate was calculated in accordance with the expression below:

Dimension exchange rate (%)=(length in longitudinal (cross) direction after 20 cycles of heating process/length in longitudinal (cross) direction before 20 cycles of heating process)×100.

<Magnetic Force Measurement>

Before the heating process and after performing 20 cycles of the heating process, the magnetic force of the masking material was measured, and the magnetic force change between before and after the heating process was confirmed. The magnetic force was measured at a location separated by 1 cm from the surface of the masking material using a commercially available gaussmeter (Handy Gaussmeter, type 5080, available from TOYO Corporation).

<Magnetic Fixing Force Measurement>

After performing 20 cycles of the heating process, the magnetic fixing force of the masking material was measured. The magnetic fixing force (N/40 mm) was measured by applying a 100 mm length end portion of the masking material (width 40 mm×length 150 mm, thickness 1.5 mm) to a stainless plate (1.5 mm thickness, SUS 430 plate) and thereafter using a tensile tester to pull parallelly, in the length direction, the stainless plate and the masking material in opposite directions to each other with a speed of 300 min/min.

<Impact Resistance>

Masking materials produced in Examples 1 and 2 and Comparative Example 1 were let fall from a position of 1.5 m height to concrete floor. Tests of falling to that floor were performed ten times to confirm whether or not to break.

<Chemical Resistance>

After immersing masking materials produced in Examples 1 and 2 and Comparative Example 1 each into lacquer thinner and the sealing material used in Example 1 and Comparative Example 1, the shape change was confirmed.

TABLE 1

|  | Example 1 | Example 2 | Comparative Example 1 |
| --- | --- | --- | --- |
| Compounded resin | Polyamide 6 | Polyamide 6 | Poly vinyl chloride |
| Magnetic material | Strontium ferrite | Strontium ferrite | Strontium ferrite |
| Releasable protective material | Sealing material | Strippable paint | Sealing material |
| Releasability of releasable protective layer | ○ | ○ | × |
| Availability of repeated use | ○ | ○ | × |
| Dimensional change rate | Longitudinal direction: 0.5%, Cross direction: 0.5% | Longitudinal direction: 0.5%, Cross direction: 0.5% | Longitudinal direction: 1.5%, Cross direction: 1.5% |
| Appearance | Nothing abnormal | Nothing abnormal | Melting trace occurring |
| Magnetic force change | None (45 mT before heating → 45 mT after heating) | None (45 mT before heating → 45 mT after heating) | Decreased (43 mT before heating → 38 mT after heating) |
| Chemical resistance | Nothing abnormal for two kinds of chemicals | Nothing abnormal for two kinds of chemicals | Melting and changing in shape for two kinds of chemicals |
| Impact resistance | No breakage | No breakage | No breakage |
| Magnetic fixing force | 5.0 N/40 mm | 5.0 N/40 mm | 4.8 N/40 mm |

As understood from Table 1, the masking materials obtained in Examples 1 and 2 had excellent heat resistance property and were able to be repeatedly used. In addition, they exhibited no magnetic change due to heating and had excellent chemical resistance property.

INDUSTRIAL APPLICABILITY

The masking material according to the present invention is preferably utilized for masking in painting work, which includes a heating process, for a steel plate for cars, or for masking in electrodeposition coating work for ground terminal portions, for example.

EXPLANATION OF NUMERAL REFERENCES

1 . . . masking material
   10 . . . plate-like main body portion
   11 . . . reinforcing rib portion
2 . . . base material
3 . . . releasable protective layer

The invention claimed is:

1. A mask for use in a heating process, the mask comprising:
a masking material configured to magnetically attach to a part of an object which is subjected to a painting process and to mask the masked part from application of a paint to the masked part during the painting process, the masking material having a structure consisting essentially of a base material having a fixing surface configured to contact and magnetically fix the mask to the masked part and a releasable protective layer in direct contact with and continuously covering another surface of the base material, the another surface of the base material being on a side of the base material opposite the fixing surface, wherein the base material comprises a resin and contains a magnetic substance, the resin has a melting point higher than 120° C. and higher than a temperature of the heating process, the magnetic substance has a Curie temperature higher than the temperature of the heating process, and the fixing surface of the base material has a sufficient magnetic force for fixing the mask onto the masked part at temperatures from 120° C. to 160° C., the releasable protective layer is applied to the another surface of the base material before painting, the releasable protective layer comprises a releasable protective material and is peelable from the base material after subjecting, the masking material to repeated cycles of the heating process, and the releasable protective layer is a layer of material separate and different from the paint used in the painting process for painting the painting object, and the paint adhered to the releasable protective layer of the masking material is removed from the base material by peeling off the releasable protective layer from the base material while the paint remains adhered to the releasable protective layer.

2. The mask as set forth in claim 1, wherein the resin is a polyamide resin.

3. The mask as set forth in claim 1, wherein the releasable protective material is a sealing material or a strippable paint.

4. The mask as set forth in claim 1, wherein the masking material has a dimension change rate caused by the heating process of 1.0% or less in a masking surface direction.

5. The mask as set forth in claim 1, wherein the base material has a magnetic fixing force to a stainless plate is within a range of 3 to 20 N/40 mm.

6. The mask as set forth in claim 2, wherein the releasable protective material is a sealing material or a strippable paint.

7. The mask as set forth in claim 2, wherein the masking material has a dimension change rate caused by the heating process is 1.0% or less in a masking surface direction.

8. The mask as set forth in claim 3, wherein the masking material has a dimension change rate caused by the heating process is 1.0% or less in a masking surface direction.

9. The mask as set forth in claim 2, wherein the base material has a magnetic fixing force to a stainless plate is within a range of 3 to 20 N/40 mm.

10. The mask as set forth in claim 3, wherein the base material has a magnetic fixing force to a stainless plate is within a range of 3 to 20 N/40 mm.

11. The mask as set forth in claim 4, wherein the base material has a magnetic fixing force to a stainless plate is within a range of 3 to 20 N/40 mm.

12. The mask as set forth in claim 1, wherein
the repeated cycles of the heating process is 20 cycles and in each heating process cycle the masking material was applied to an adherend corresponding to the masked part; and
after the 20 cycles of the heating process,
the dimension change rate caused by the heating process was 1.0% or less in a masking surface direction of the masking material,
the masking material did not thermally adhere to the adherend and no contamination to the adherend was present, and
the releasable protective layer was released from the base material.

13. The mask as set forth in claim 1, wherein the releasable protective layer is peelable from the base material without using any solvent after subjecting the masking material to repeated cycles of the heating process.

14. A mask for use in a heating process, the mask comprising:
a masking material releasably attached to a masked part of a painting object which is subjected to a painting process and configured to mask the masked pad from application of a paint to the masked part during the painting process, the masking material having a structure consisting essentially of a base material having a fixing surface contacting and magnetically fixing the mask to the masked para and a releasable protective material in direct contact with and completely covering another surface of the base material, the another surface of the base material being on a side of the base material opposite the fixing surface, wherein the base material comprises a resin and contains a magnetic substance, the resin having a melting point higher than 120° C. and higher than a temperature of 120° C. used in the heating process, the magnetic substance has a Curie temperature higher than the temperature of the heating process, and the fixing surface of the base material has a sufficient magnetic force for fixing the mask onto the masked part at temperatures from 120° C. to 160° C., and the releasable protective material is applied to the another surface of the base material before the painting process, the releasable protective material completely covers the another surface of the base material and prevents application of the paint to the another surface of the base material, the releasable protective layer is releasable from the base material by peeling after the masking material is subjected to repeated cycles of the heating process, and the releasable protective layer is a layer of material separate and different from the paint used in the painting process for painting the painting object, and the paint adhered to the releasable protective layer of the masking material is removed from the base material by simply peeling off the releasable protective layer from the base material while the paint remains adhered to the releasable protective layer.

15. The mask as set forth in claim 14, wherein the resin is a polyamide resin.

16. The mask as set forth in claim 14, wherein the releasable protective material is a sealing material or a strippable paint.

17. The mask as set forth in claim 14, wherein the masking material has a dimension change rate caused by the heating process is 1.0% or less in a masking surface direction.

18. The mask as set forth in claim 14, wherein the base material has a magnetic fixing force to a stainless plate is within a range of 3 to 20 N/40 mm.

19. The mask as set forth in claim 14, wherein
the repeated cycles of the heating process is 20 cycles and in each heating process cycle the masking material was applied to an adherend corresponding to the masked part; and after the 20 cycles of the heating process, the dimension change rate caused by the heating process was 1.0% or less in a masking surface direction of the masking material, the masking material did not thermally adhere to the adherend and no contamination to the adherend was present, and the releasable protective layer was released from the base material.

20. The mask as set forth in claim 14, wherein the releasable protective material is releasable from the base material by peeling without using any solvent after subjecting the masking material to repeated cycles of the heating process.

* * * * *